United States Patent
Marupaduga et al.

(10) Patent No.: US 9,794,820 B1
(45) Date of Patent: Oct. 17, 2017

(54) WIRELESS COMMUNICATION NETWORK TO CONTROL RADIO FREQUENCY (RF) MEASUREMENT REPORTING FOR USER EQUIPMENT

(71) Applicant: Sprint Communications Company L.P., Overland Park, KS (US)

(72) Inventors: Sreekar Marupaduga, Overland Park, KS (US); Ahmad N. Saleh, Rochester Hills, MI (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/337,019

(22) Filed: Oct. 28, 2016

(51) Int. Cl.
*H04B 7/15* (2006.01)
*H04W 24/10* (2009.01)
*H04B 17/364* (2015.01)

(52) U.S. Cl.
CPC .......... *H04W 24/10* (2013.01); *H04B 17/364* (2015.01)

(58) Field of Classification Search
CPC ........ H04W 24/10; H04B 17/364; H04B 7/14
See application file for complete search history.

(56) References Cited

U.S. PATENT DOCUMENTS

| | | | |
|---|---|---|---|
| 8,195,166 B1 | 6/2012 | Oprescu-Surcobe et al. | |
| 8,503,336 B2 | 8/2013 | Rappaport et al. | |
| 2006/0019679 A1 | 1/2006 | Rappaport et al. | |
| 2008/0090581 A1 | 4/2008 | Hu | |
| 2010/0284446 A1* | 11/2010 | Mu | H04B 7/15521 375/211 |
| 2012/0108253 A1* | 5/2012 | Mao | H04W 48/20 455/450 |
| 2012/0170547 A1 | 7/2012 | Oprescu-Surcobe et al. | |
| 2014/0029586 A1 | 1/2014 | Loehr et al. | |
| 2014/0092771 A1 | 4/2014 | Siomina et al. | |
| 2015/0341881 A1* | 11/2015 | Hiltunen | H04W 64/00 370/350 |
| 2016/0242152 A1* | 8/2016 | Yu | H04W 8/005 |

\* cited by examiner

*Primary Examiner* — Nguyen Vo

(57) ABSTRACT

A wireless communication network to control Radio Frequency (RF) measurement reporting for User Equipment (UE). A wireless base station receives initial wireless data transferred by the UE. The wireless base station processes wireless data from the UE to detect a repeater chain repeating the wireless data between the UE and the wireless base station and to determine a wireless signal metric. The wireless base station processes the wireless signal metric based on the detection of the repeater chain to select a new RF measurement reporting frequency for the UE. The wireless base station transfers an instruction to the UE indicating the new RF measurement reporting frequency and receives subsequent wireless data transferred by the UE using the new RF measurement reporting frequency.

20 Claims, 6 Drawing Sheets

US 9,794,820 B1

WIRELESS COMMUNICATION NETWORK TO CONTROL RADIO FREQUENCY (RF) MEASUREMENT REPORTING FOR USER EQUIPMENT

TECHNICAL BACKGROUND

Wireless communication systems transfer data packets between User Equipment (UE) to provide data communication services, like internet access, voice calls, media streaming, user messaging, among other communication services. Wireless communication systems allow users to move about and communicate over the air with access communication.

To expand or enhance the wireless signal coverage of a wireless communication network, repeaters may be added to locations not adequately covered by current network infrastructure. A repeater transmits and receives wireless signals exchanged between UEs and a wireless access point. Without the signal repetition provided by the wireless repeater, the coverage area of the wireless network access point may otherwise have not extended far enough to serve the UEs using the repeater. Thus, a wireless repeater provides a less resource intensive means for increasing wireless network coverage.

UEs transmit Radio Frequency measurement reports to wireless access points indicating UE feedback data, such as current channel conditions, current state of memory buffers, antennas that should be transmitted on the downlink, how many transmission streams can be simultaneously supported, acknowledgements that data was received successfully, and other feedback information. RF measurement reports may be periodically transmitted or transmitted in response to an event, such as when a UE is initiating a handoff from one base station to another. Periodic RF measurement reports are transmitted based on a reporting frequency period and the UE is configured to track which wireless signal metrics are to be transmitted in the RF measurement reports and at which reporting frequencies. However, a UE exchanging signaling and data with a wireless access point over a wireless repeater in a repeater chain or a UE moving at a high velocity may need to report RF measurements more often. Unfortunately, current methods of controlling an RF measurement reporting frequency is not optimal for a UE experiencing higher signal condition changes.

TECHNICAL OVERVIEW

A wireless communication network to control Radio Frequency (RF) measurement reporting for User Equipment (UE). A wireless base station receives initial wireless data transferred by the UE. The wireless base station processes wireless data from the UE to detect a repeater chain repeating the wireless data between the UE and the wireless base station and to determine a wireless signal metric. The wireless base station processes the wireless signal metric based on the detection of the repeater chain to select a new RF measurement reporting frequency for the UE. The wireless base station transfers an instruction to the UE indicating the new RF measurement reporting frequency and receives subsequent wireless data transferred by the UE using the new RF measurement reporting frequency.

DETAILED DESCRIPTION

Figure 1:
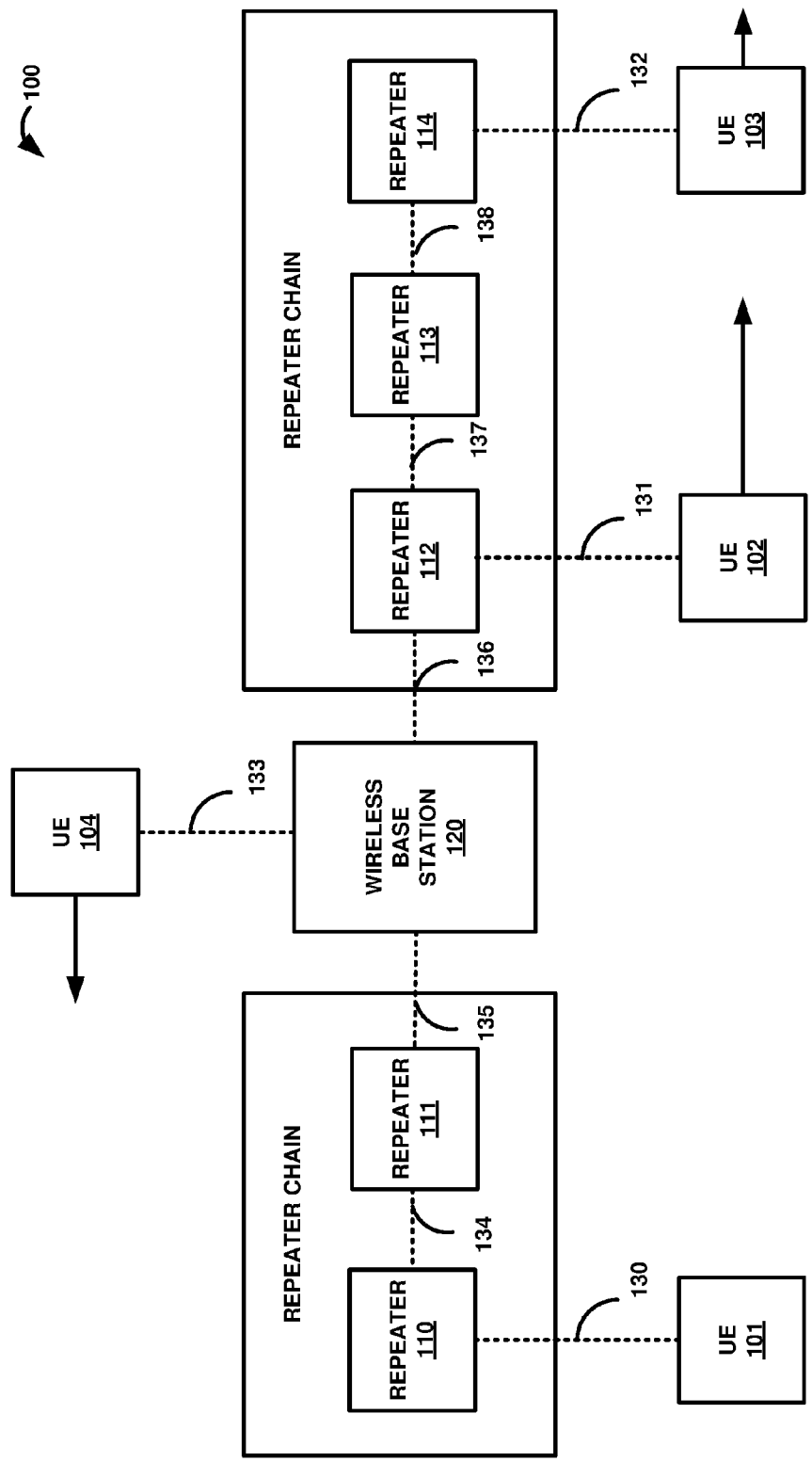
FIGS. 1-2 illustrate a wireless communication system to control Radio Frequency (RF) measurement reporting for User Equipment (UE).
Figure 2:
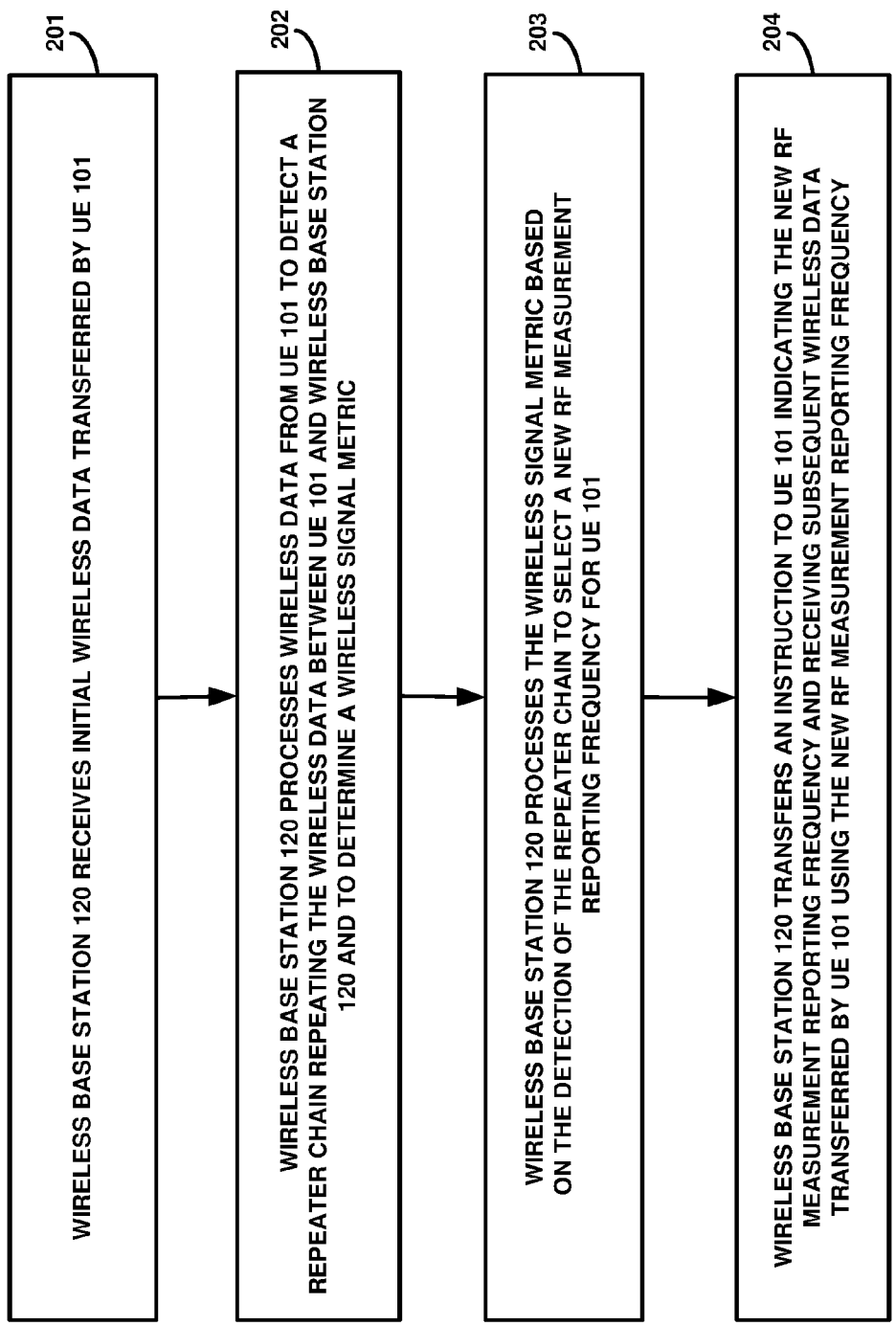
Figure 3:
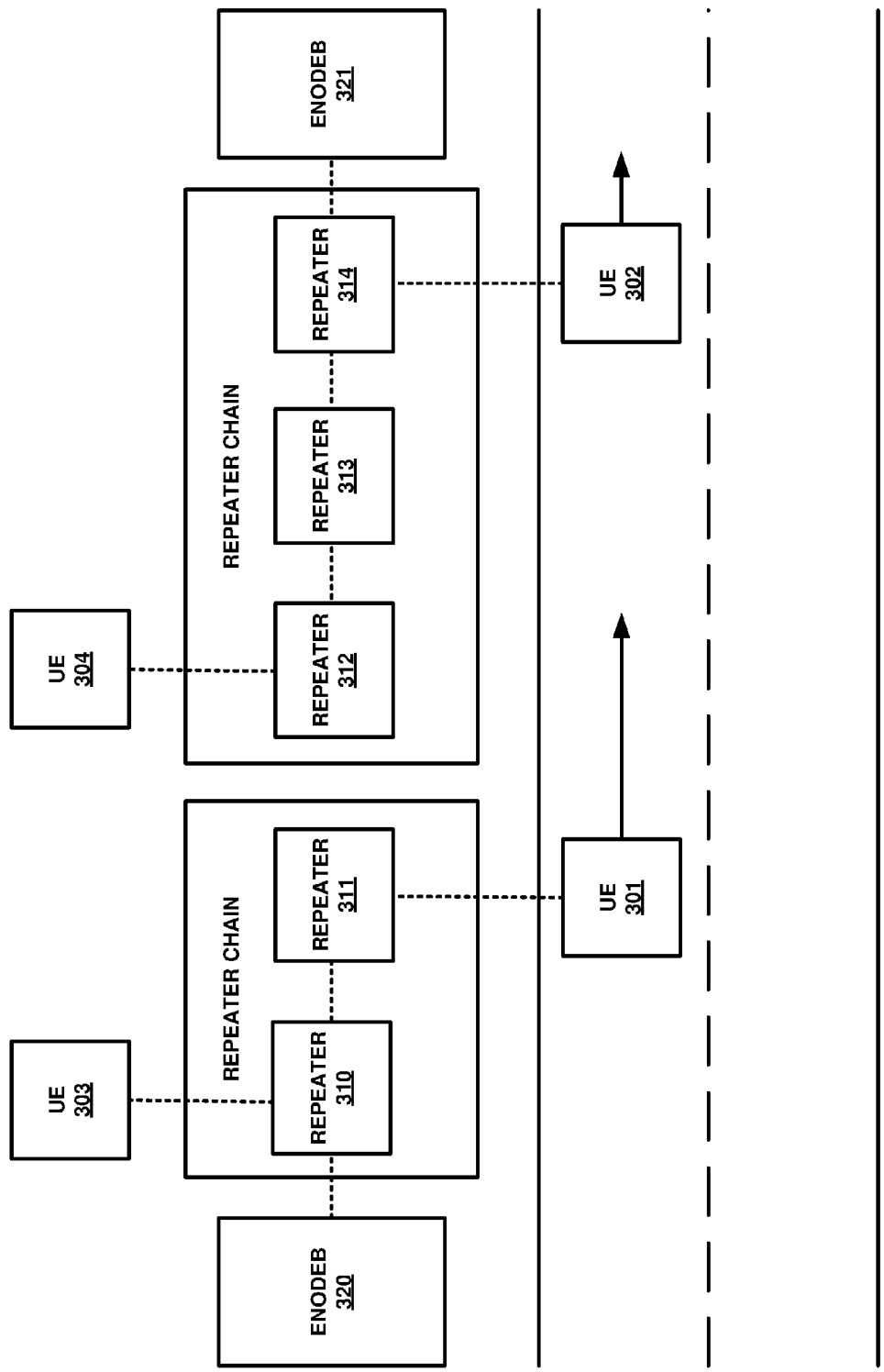
FIGS. 3-4 illustrate a Long Term Evolution (LTE) communication system to control RF measurement reporting for UE.

FIGS. 1-3 illustrate wireless communication system 100 to dynamically modify a reporting frequency for a UE. Referring to FIG. 1, communication system 100 comprises UEs 101-104, wireless repeaters 110-114, and wireless base station 120. UEs 101-104 communicate with wireless repeaters 110-114 and wireless base station 120 over wireless links 130-133. Wireless repeaters 110-114 communicate with wireless base station 120 over communication links 134-138.

As indicated by the arrows, some UEs, such as UEs 102-104, may be in motion and other UEs, such as UE 101, may be stationary. Longer arrows indicated that the UE velocity is faster and shorter arrows indicate that the UE velocity is lower. Additionally, some UEs, such as UEs 101-103 are exchanging signaling and data with wireless base station 120 over one or more wireless repeaters in the repeater chain and other UEs, such as UE 104, are exchanging signaling and data with wireless base station 120 directly.

UEs 101-104 could each be a phone, tablet computer, media device, an intelligent machine, or some other apparatus having a wireless transceiver. UEs 101-104 each include processing circuitry and memory that store and execute various software modules. UEs 101-104 transfer and receive wireless data to a wireless base station directly or over a wireless repeater in a repeater chain. UEs 101-104 also periodically transfer RF measurement reports to wireless base stations at RF measurement reporting frequency time periods. Although UEs 101-104 may also transfer RF measurement reports automatically in response to a RF measurement report request, wireless network attachment, or a wireless base station handover, and the like.

Wireless repeaters 110-114 may each comprise a minimacro cell, a femtocell, a picocell, or some other wireless base station capable of providing wireless communication services to UE 101-104. Wireless repeaters 110-114 in the repeater chain typically include amplifiers, filters, RF modulators, and signal processing circuitry. Wireless repeaters 110-114 may be configured to extend wireless coverage from wireless base station 120 to UEs 101-104. Wireless repeaters 110-114 are capable of receiving and transmitting wireless data and RF measurement reporting information between base station 120 and UEs 101-104.

Wireless base station 120 may comprise a macro base station, a 5G base station, an evolved NodeB (eNodeB), or some other base station that may provide wireless communication services to UEs 101-104. Wireless base station 120 includes RF communication circuitry, communication interfaces, network interfaces, processing systems, microprocessors, storage systems, storage media, or some other processing devices or software systems, and may be distributed among multiple devices. Wireless base station 120 may be configured to provide wireless coverage to UEs 101-104 for voice calls, media streaming, internet access, text messages, and the like. Wireless base station 120 can be configured to receive RF measurement reporting data from UEs 101-104, detect a repeater chain repeating wireless data, and determine a wireless signal metric to select a new RF measurement reporting frequency for UEs 101-104.

Wireless links 130-138 may use air, space, or some other wireless material that transports media. Wireless link 130 may use protocols, such as LTE, Code Division Multiple Access (CDMA), Orthogonal Frequency Division Multiplexing Access (OFDMA), LTE Wireless Aggregation (LWA), Internet Protocol (IP), or some other wireless communication format—including combinations thereof.

In operation, wireless base station 120 receives initial wireless data transferred by UE 101. Initial data may be wireless signaling data, wireless user data, and an RF measurement report. RF measurement reports may include UE feedback data indicating current channel conditions, current state of memory buffers, antennas that should be transmitted on the downlink, how many transmission streams can be simultaneously supported, acknowledgements that data was received successfully, and other feedback information for wireless base station 120 and/or a wireless communication network.

RF measurement reports may be periodically transmitted or transmitted in response to an event, such as when a UE is initiating a handoff from one base station to another. Periodic RF measurement reports are transmitted based on a reporting frequency period and the UE is configured to track which wireless signal metrics are to be transmitted in the RF measurement reports and at which reporting frequencies. For example, signal power data may be transmitted from UE 101 to wireless base station 120 every two seconds. An initial reporting frequency may be determined by wireless base station 120, be a default reporting frequency initially determined by a vendor of UE 101, or be determined by some other network control element from a wireless communication network.

Wireless base station 120 processes wireless data from UE 101 to detect a repeater chain repeating the wireless data between UE 101 and wireless base station 120 and to determine a wireless signal metric. The wireless signal metric may be a signal power indicator, a signal strength indicator, or a signal quality indicator. For example, the wireless signal metric may be a Reference Signal Received Power (RSRP), a Reference Signal Strength Indicator (RSSI), or some other signal strength indicator. In other examples, the wireless signal metric may be a Channel Quality Indicator (CQI), a Precoding Matrix Indicator (PMI), a Rank Index (RI), or a Round Trip Time (RTT).

In some examples, wireless base station 120 may process the wireless data from UE 101 to detect a repeater chain repeating the wireless data by processing latency between UE 101 and wireless base station 120 and comparing the latency to a latency threshold. In this example, wireless base station 120 may then select the new RF measurement report frequency for UE 101 by processing the latency to select the new RF measurement reporting frequency for UE 101. In other examples, wireless base station 120 may then select the new RF measurement report frequency for UE 101 by processing the latency to determine a repeater hop count and then select the new RF measurement reporting frequency for UE 101.

In some examples, wireless base station 120 may also determine a mobility factor for UE 101. Wireless base station 120 may then process the wireless signal metric based on the detection of the repeater chain and the mobility factor for UE 101 to select the new RF measurement reporting frequency for UE 101. In this example, wireless base station 120 may determine the mobility factor for UE 101 by determining a number of wireless base stations servicing UE 101 per time period. In other examples, wireless base station 120 may determining the mobility factor for UE 101 by performing radio triangulation for UE 101. It should also be noted that wireless base station 120 may also select the new RF measurement reporting frequency based on other factors, such as reported RSRP, RSSI, CQI, and the like.

In a next operation, wireless base station 120 processes the wireless signal metric based on the detection of the repeater chain to select a new RF measurement reporting frequency for UE 101. The new RF measurement reporting frequency may be selected by determining that the latency exceeds a latency threshold. For example, a high latency may indicate that UE 101 is on the repeater chain and therefore, should have a higher RF measurement reporting frequency. In other examples, the high latency may indicate that UE 101 is on a repeater further from wireless base station 120, such as repeater 110, and therefore, should have a higher RF measurement reporting frequency.

The new RF measurement reporting frequency may also be selected by determining that a mobility factor exceeds a mobility factor threshold. For example, a high mobility factor may indicate the UE is moving, such as UE 102, and therefore, should have a higher RF measurement reporting frequency. In other examples, the high mobility factor may indicate that UE 102 is being served by one or more wireless base stations in addition to wireless base station 120, and therefore, should have a higher RF measurement reporting frequency. It should be noted that the high mobility factor may be determined by performing radio triangulations for the UE, Global Positioning System measurements, or some other UE location and time based measurements that indicate UE velocity. The new RF measurement reporting frequency may be selected based on an individual variable, such as the determined repeater hop count for the UE. The new RF measurement reporting frequency may also be selected by weighing any combination of variables, such as UE latency, mobility, and reported RSRP.

Wireless base station 120 transfers an instruction to UE 101 indicating the new RF measurement reporting frequency and receives subsequent wireless data transferred by UE 101 using the new RF measurement reporting frequency. The instruction may be sent in a Remote Resource Configuration message (RRC), a Non-Access Stratum (NAS) message, or some other message indicating to UE 101 the new RF reporting frequency for the measurement reports. Wireless base station 120 then receives subsequent wireless data from UE 101 using the new RF reporting frequency.

FIG. 2 is a flow diagram illustrating an operation of wireless communication system 100 to control RF measurement reporting for UE. In a first operation, wireless base station 120 receives (201) initial wireless data transferred by UE 101. Wireless base station 120 processes (202) wireless data from UE 101 to detect a repeater chain repeating the wireless data between UE 101 and wireless base station 120 and to determine a wireless signal metric. Wireless base station 120 processes (203) the wireless signal metric based on the detection of the repeater chain to select a new RF measurement reporting frequency for UE 101. Wireless base station 120 transfers (204) an instruction to UE 101 indicating the new RF measurement reporting frequency and receives (204) subsequent wireless data transferred by UE 101 using the new RF measurement reporting frequency.

FIG. 3 illustrates Long Term Evolution (LTE) communication system 300 to control RF measurement reporting for UE. LTE communication system 300 is an example of wireless communication system 100, although wireless communication system 100 may use alternative configurations and operations. LTE communication system 300 includes UEs 301-304, wireless repeaters 310-314, and eNodeBs 320-321.

UE 301 exchanges wireless data with eNodeB 320 over wireless repeaters 310-311 using RF links. UE 302 exchanges wireless data with eNodeB 321 over wireless repeater 314 using RF links. UE 303 exchanges wireless data with eNodeB 320 over wireless repeater 310 using RF links. UE 304 exchanges wireless data with eNodeB 321 over wireless repeaters 312-314 using RF links. As shown by the arrows, UEs 301-302 are moving from eNodeB 320 toward eNodeB 321 where the longer arrow on UE 301 indicates that UE 301 is moving at a higher velocity than UE 302. UEs 303-304 do not have arrows indicating that UEs 303-304 are stationary. In this example, UEs 301-302 are moving along a highway and wireless repeaters 310-314 and eNodeBs 320-321 are located on the side of the road.

Figure 4:
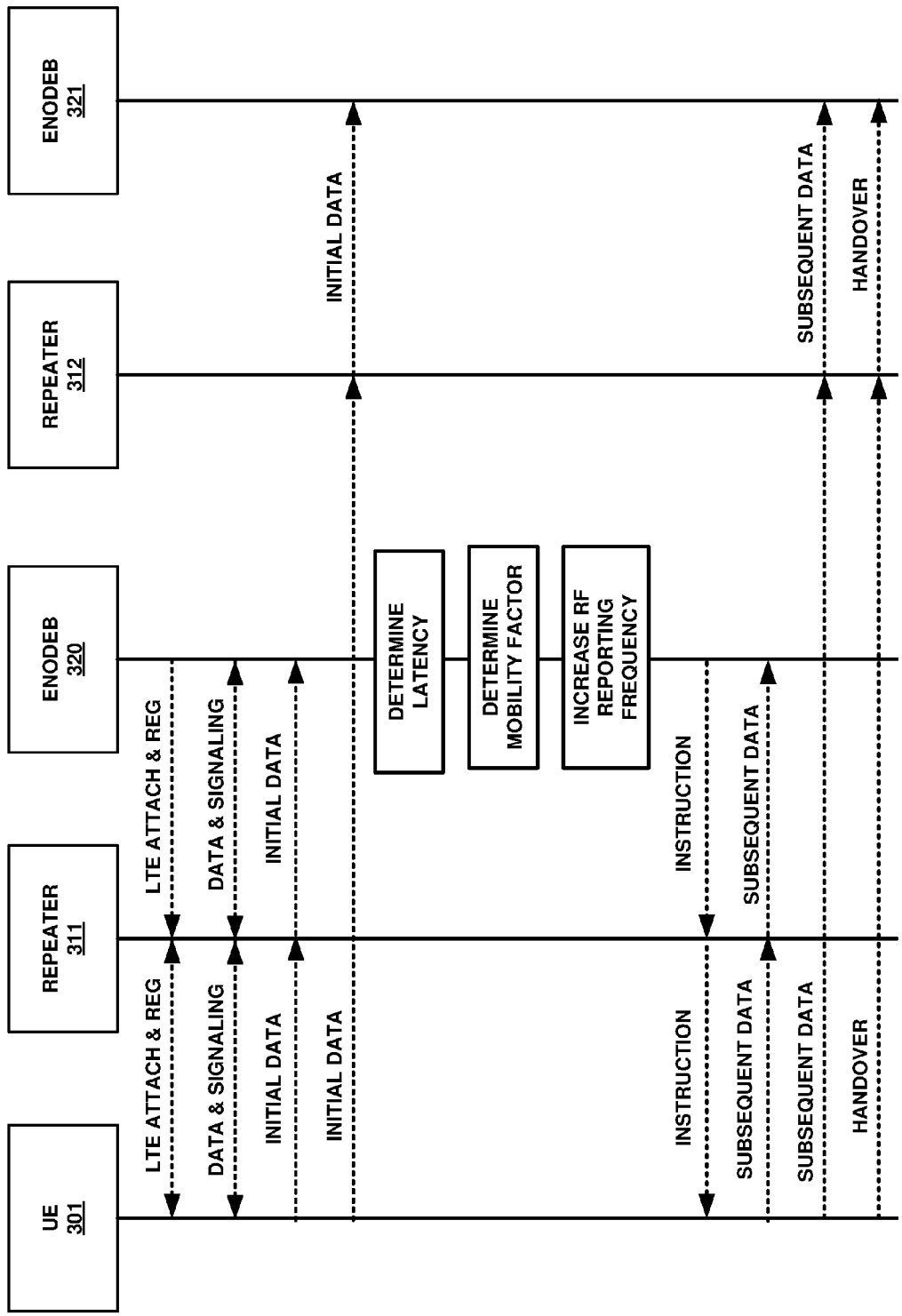

FIG. 4 is a sequence diagram illustrating the operation of LTE communication system 300 to control RF measurement reporting for UE 301. In a first operation, eNodeB 320 receives a receives initial wireless data transferred by UE 301. eNodeB 320 processes wireless data from UE 301 to detect a repeater chain repeating the wireless data between UE 301 and eNodeB 320 and to determine a wireless signal metric. In this example, eNodeB 320 processes the latency to determine the repeater hop count of two repeaters for UE 301. eNodeB 320 also determines a mobility factor for UE 301 by determining that UE 301 is initiating a handover from eNodeB 320 to eNodeB 321. eNodeB 320 may also determine a velocity for UE 301 by performing radio triangulation for UE 301 using the locations of eNodeB 320, eNodeB 321, and the highway.

eNodeB 320 then processes the repeater hop count and the mobility factor for UE 301 to determine an increased RF measurement reporting frequency for UE 301. eNodeB 320 transfers an instruction to UE 301 indicating the increased RF measurement reporting frequency and receives subsequent wireless data transferred by UE 301 using the increased RF measurement reporting frequency. UE 301 is then handed-over from eNodeB 320 exchanging wireless data over wireless repeater 311 to eNodeB 321 exchanging data over wireless repeater 312. Advantageously, the RF measurement reporting frequency increases as UE 301 is further down the repeater chain, moving at a higher velocity, and initiating a handover to another eNodeB.

Figure 5:
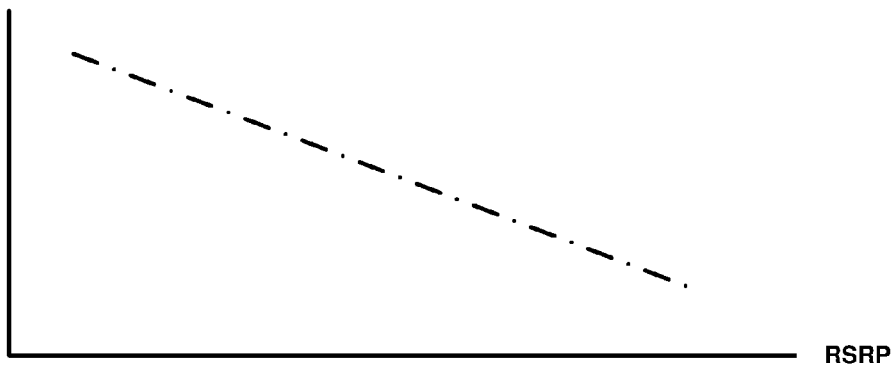
FIG. 5 illustrates graphs for variables to control RF measurement reporting for UE.
Figure 5:
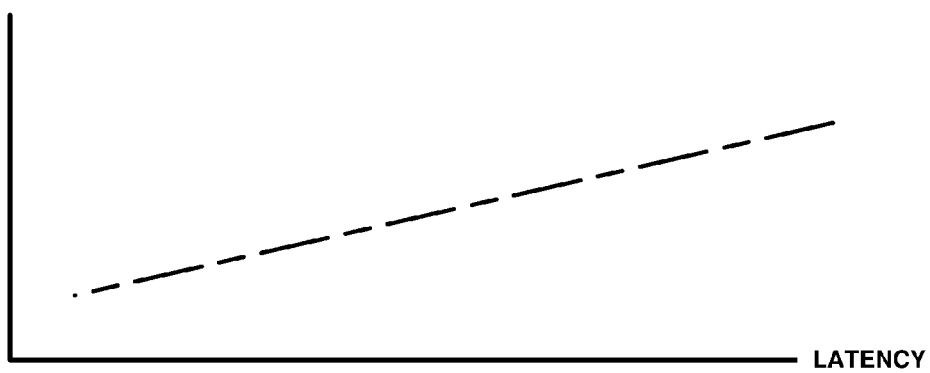
Figure 5:
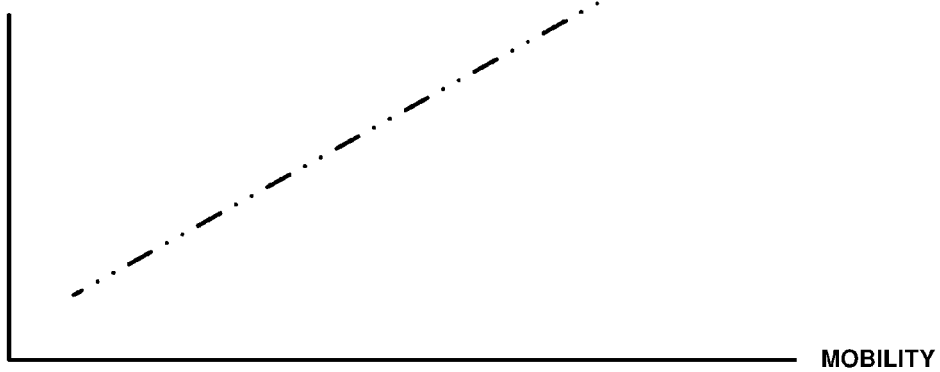

FIG. 5 illustrates RF measurement report frequency graphs to control RF measurement reporting for UE. The RF measurement report frequency graphs include, an RSRP variable graph, a latency variable graph, and a mobility variable graph. Although each of the graphs illustrates how an individual variable is processed to determine a new RF measurement reporting frequency, the new RF measurement reporting frequency may be selected weighing a combination of variables for the UE. Referring to the RSRP variable graph, as the RSRP increases, the RF measurement reporting frequency decreases. On the other hand, as the RSRP decreases, the RF measurement reporting frequency increases.

Referring to the latency variable graph, as the latency for the UE wireless data increases, the RF measurement reporting frequency increases. For example, as the UE moves further down the repeater chain and increases the repeater hop count, the wireless base station may indicate that the UE needs to transmit its RF measurement reports more often and therefore, the wireless base station will increase the RF measurement reporting frequency for the UE. As the latency for the UE wireless data decreases, the RF measurement reporting frequency decreases.

Referring to the mobility variable graph, as the mobility of the UE increases, the RF measurement reporting frequency increases. For example, as the number of wireless base stations serving the UE per time period increases, the wireless base station may indicate that the UE needs to transmit its RF measurement reports more often and therefore, increase the RF measurement reporting frequency for the UE. As the mobility of the UE decreases, the RF measurement reporting frequency decreases. For example, as the velocity of the UE increases as determined by performing radio triangulation for the UE, the RF measurement reporting frequency for the UE decreases.

Figure 6:
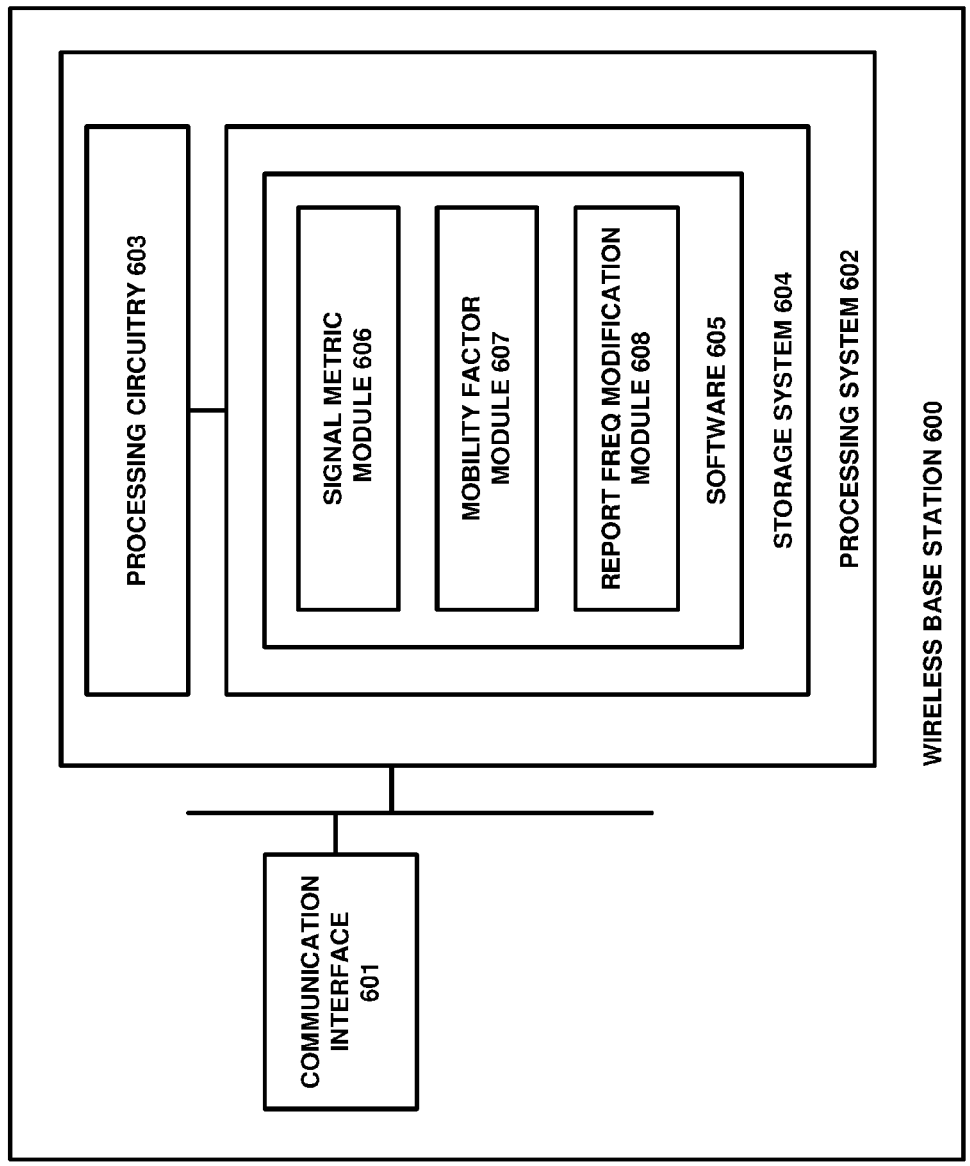
FIG. 6 illustrates a wireless base station to control RF measurement reporting for UE.

FIG. 6 illustrates wireless base station 600 to control RF measurement reporting for UE. Wireless base station 600 is an example of wireless base station 120, eNodeB 320, and eNodeB 321, although wireless base station 120, eNodeB 320, and eNodeB 321 may use alternative configurations and operations. Wireless base station 600 includes communication interface 601 and data processing system 602. Data processing system 602 is linked to communication interface 601.

Communication interface 601 comprises communication components, such as antennas, ports, amplifiers, filters, modulators, signal processors, and the like. Communication interface 601 may be configured to communicate over metallic, wireless, optical links, or some other communication media material. Communication interface 601 may be configured to use Time Division Multiplex (TDM), Internet Protocol (IP), Ethernet, optical networking, wireless protocols, communication signaling, or some other communication format—including combinations thereof. Communication interface 601 may be configured to receive wireless data from one or more UE, both directly or over a repeater chain. Communication interface 601 may also be configured to transfer an instruction to a UE indicating a new RF measurement reporting frequency.

Data processing system 602 includes processing circuitry 603 and storage system 604 that stores software 605. Processing circuitry 603 comprises a microprocessor and other circuitry that retrieves and executes software 605 from storage system 604. Storage system 604 comprises a non-transitory storage medium, such as a disk drive, flash drive, data storage circuitry, or some other memory apparatus. Software 605 comprises computer programs, firmware, or some other form of machine-readable processing instructions. Software 605 may further include an operating system, utilities, drivers, network interfaces, applications, or some other type of software. When executed by processing circuitry 603, software 605 directs processing system 602 to operate wireless base station 600 as described herein.

When executed by processing circuitry 603, wireless signal metric module 606 directs processing circuitry 604 to receive initial wireless data and subsequent wireless data transferred by a UE. When executed by processing circuitry 603, wireless signal metric module 606 also directs processing circuitry 603 to process the initial wireless data to detect a repeater chain repeating the wireless data between the UE and wireless base station 600 and to determine a wireless signal metric. When executed by processing circuitry 603, mobility factor module 607 directs processing circuitry 604 to determine a mobility factor for the UE.

When executed by processing circuitry 603, reporting frequency modification module 608 directs processing circuitry 603 to process the wireless signal metric based on the detection of the repeater chain and the mobility factor to select the new RF measurement reporting frequency for the UE. When executed by processing circuitry 603, reporting frequency modification module 608 also directs processing circuitry 603 to transfer an instruction to the UE indicating the new RF measurement reporting frequency.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless communication network to control Radio Frequency (RF) measurement reporting for User Equipment (UE), the method comprising:
a wireless base station receiving initial wireless data transferred by the UE;
the wireless base station processing wireless data from the UE to detect a repeater chain repeating the wireless data between the UE and the wireless base station and to determine a wireless signal metric;
the wireless base station processing the wireless signal metric based on the detection of the repeater chain to select a new RF measurement reporting frequency for the UE; and
the wireless base station transferring an instruction to the UE indicating the new RF measurement reporting frequency and receiving subsequent wireless data transferred by the UE using the new RF measurement reporting frequency.

2. The method of claim 1 wherein the wireless base station processing wireless data from the UE to detect a repeater chain repeating the wireless data between the UE and the wireless base station comprises the wireless base station processing latency between the UE and the wireless base station and comparing the latency to a latency threshold.

3. The method of claim 2 wherein the wireless base station processing the wireless signal metric based on the detection of the repeater chain to select a new RF measurement reporting frequency for the UE comprises the wireless base station processing the latency to select the new RF measurement reporting frequency for the UE.

4. The method of claim 2 wherein the wireless base station processing the wireless signal metric based on the detection of the repeater chain to select a new RF measurement reporting frequency for the UE comprises the wireless base station processing the latency to determine a repeater hop count and select the new RF measurement reporting frequency for the UE.

5. The method of claim 1 further comprising the wireless base station determining a mobility factor for the UE and wherein processing the wireless signal metric based on the detection of the repeater chain to select the new RF measurement reporting frequency for the UE comprising processing the wireless signal metric based on the detection of the repeater chain and the mobility factor for the UE to select the new RF measurement reporting frequency for the UE.

6. The method of claim 5 wherein determining the mobility factor for the UE comprises determining a number of wireless base stations serving the UE per time period.

7. The method of claim 5 wherein determining the mobility factor for the UE comprises performing radio triangulation for the UE.

8. The method of claim 1 wherein the wireless signal metric comprises a signal strength metric.

9. The method of claim 1 wherein the wireless signal metric comprises a signal power metric.

10. The method of claim 1 wherein the wireless signal metric comprises a signal quality metric.

11. A wireless communication network to control Radio Frequency (RF) measurement reporting for User Equipment (UE), the wireless communication network comprising:
a wireless base station configured to receive initial wireless data transferred by the UE;
the wireless base station configured to process wireless data from the UE to detect a repeater chain repeating the wireless data between the UE and the wireless base station and to determine a wireless signal metric;
the wireless base station configured to process the wireless signal metric based on the detection of the repeater chain to select a new RF measurement reporting frequency for the UE; and
the wireless base station configured to transfer an instruction to the UE indicating the new RF measurement reporting frequency and receive subsequent wireless data transferred by the UE using the new RF measurement reporting frequency.

12. The wireless communication network of claim 11 wherein the wireless base station configured to process wireless data from the UE to detect a repeater chain repeating the wireless data between the UE and the wireless base station comprises the wireless base station configured to process latency between the UE and the wireless base station and compare the latency to a latency threshold.

13. The wireless communication network of claim 12 wherein the wireless base station configured to process the wireless signal metric based on the detection of the repeater chain to select a new RF measurement reporting frequency for the UE comprises the wireless base station configured to process the latency to select the new RF measurement reporting frequency for the UE.

14. The wireless communication network of claim 12 wherein the wireless base station configured to process the wireless signal metric based on the detection of the repeater chain to select a new RF measurement reporting frequency for the UE comprises the wireless base station configured to process the latency to determine a repeater hop count and select the new RF measurement reporting frequency for the UE.

15. The wireless communication network of claim 11 further comprising the wireless base station configured to determine a mobility factor for the UE and wherein the wireless base station configured to process the wireless signal metric based on the detection of the repeater chain to select the new RF measurement reporting frequency for the UE comprising the wireless base station configured to process the wireless signal metric based on the detection of the repeater chain and the mobility factor for the UE to select the new RF measurement reporting frequency for the UE.

16. The wireless communication network of claim 15 wherein the wireless base station configured to determine the mobility factor for the UE comprises the wireless base station configured to determine a number of wireless base stations serving the UE per time period.

17. The wireless communication network of claim 15 wherein the wireless base station configured to determine the mobility factor for the UE comprises the wireless base station configured to perform radio triangulation for the UE.

18. The wireless communication network of claim 11 wherein the wireless signal metric comprises a signal strength metric.

19. The wireless communication network of claim 11 wherein the wireless signal metric comprises a signal power metric.

20. The wireless communication network of claim 11 wherein the wireless signal metric comprises a signal quality metric.

* * * * *